Figure 1:
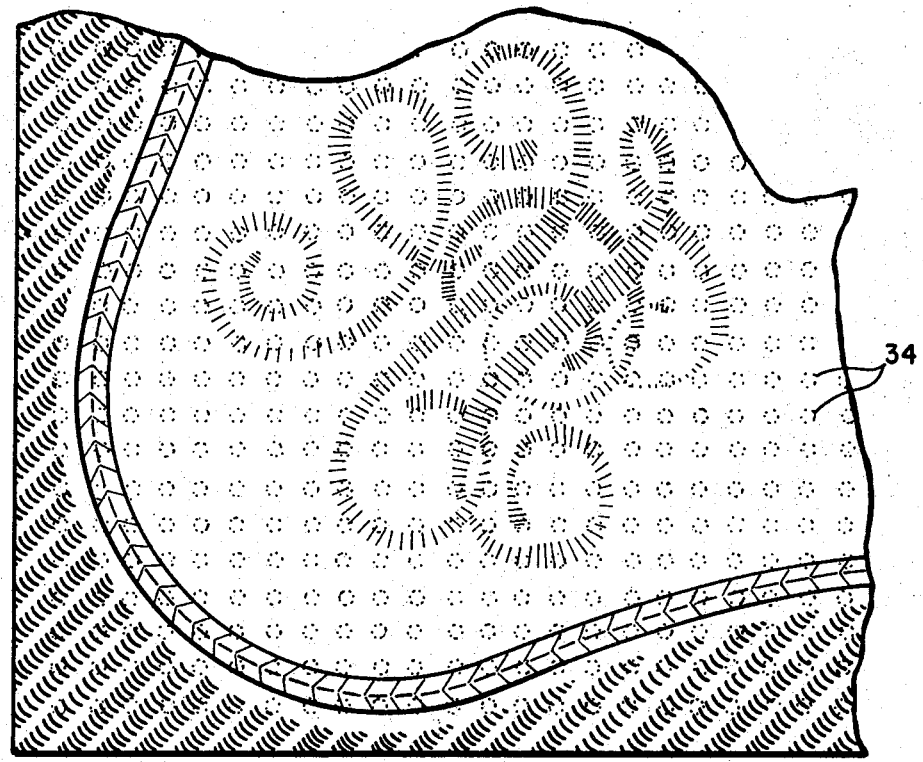

United States Patent
Murphy et al.

[15] 3,673,060
[45] June 27, 1972

[54] ADHESIVELY LAMINATED CREPED DINNER NAPKIN

[72] Inventors: James A. Murphy; Stirling Robert Brown, both of Oxnard, Calif.

[73] Assignee: International Paper Company, New York, N.Y.

[22] Filed: Jan. 12, 1970

[21] Appl. No.: 1,999

[52] U.S. Cl..........................161/126, 156/163, 156/220, 156/291, 161/129, 161/130, 161/138, 161/148
[51] Int. Cl..........................................................B32b 3/02
[58] Field of Search..................161/129, 128, 148, 146, 147, 161/127, 130, 156, 149, 126, 138; 156/163, 164, 183, 229; 117/155 UR

[56] References Cited

UNITED STATES PATENTS

| | | | |
|---|---|---|---|
| 3,214,323 | 10/1965 | Russell et al. | 156/291 |
| 3,316,136 | 4/1967 | Pufahl | 161/76 |
| 2,729,267 | 1/1956 | Walton | 161/129 |
| 3,327,708 | 6/1967 | Sokolowski | 156/290 |
| 3,025,199 | 3/1962 | Harwood | 161/85 |
| 2,030,746 | 2/1936 | Galligan et al. | 161/76 |
| 3,047,445 | 7/1962 | Gresham | 161/129 |

Primary Examiner—Robert F. Burnett
Assistant Examiner—Linda Koeckert
Attorney—Anderson, Luedeka, Fitch, Even & Tabin

[57] ABSTRACT

An adhesively laminated creped tissue product, having particular usefulness as a dinner napkin, is formed from two creped tissue webs superposed with the lines of creping of each web substantially parallel to the lines of creping of the other, and patterned adhesive disposed between the webs. Each web is in a different condition of stress in the plane of the laminated product. The bonded webs may be formed into individual napkins embossed about their periphery, leaving a substantial unembossed area in the center.

5 Claims, 2 Drawing Figures

PATENTED JUN 27 1972

3,673,060

INVENTORS.
James A. Murphy
Sterling Robert Brown
BY
Anderson, Luedeka, Fitch, Even & Tabin
ATTORNEYS

ADHESIVELY LAMINATED CREPED DINNER NAPKIN

This invention relates generally to adhesively laminated creped tissue products and more particularly to an adhesively laminated creped tissue product useful as a dinner napkin. This invention also relates to a method of manufacture of such adhesively laminated creped tissue products.

Soft dinner napkins made of creped tissue have long been known in the art. Creped tissue, though desirably soft, ordinarily has very low strength. Stronger creped tissue dinner napkins have been made in the prior art by adding well-known strength-imparting resins to the tissue web, but such treatment makes the tissue undesirably harsh and stiff. Further, these resins, if present in substantial quantity, create a glassy surface on the napkin such that the napkin is unpleasing to the eye and touch. Further, because of their slick surface and low flexibility, such napkins also are difficult to retain in the lap of the user. Embossing has been used in attempts to improve the appearance of creped tissue napkins, but without wet strength resins in the tissue, even slight moisture causes the embossing to fade out, and although wet strength resins retain embossing to a greater degree, the product suffers the disadvantages or harshness and stiffness referred to hereinbefore.

It is therefore an object of this invention to provide a soft, strong and flexible adhesively laminated creped tissue product which is especially useful as a dinner napkin. It is also an object to provide a method for the manufacture of such product.

Other objects and advantages of the invention will become known by reference to the following description and the accompanying drawings.

Figure 2:
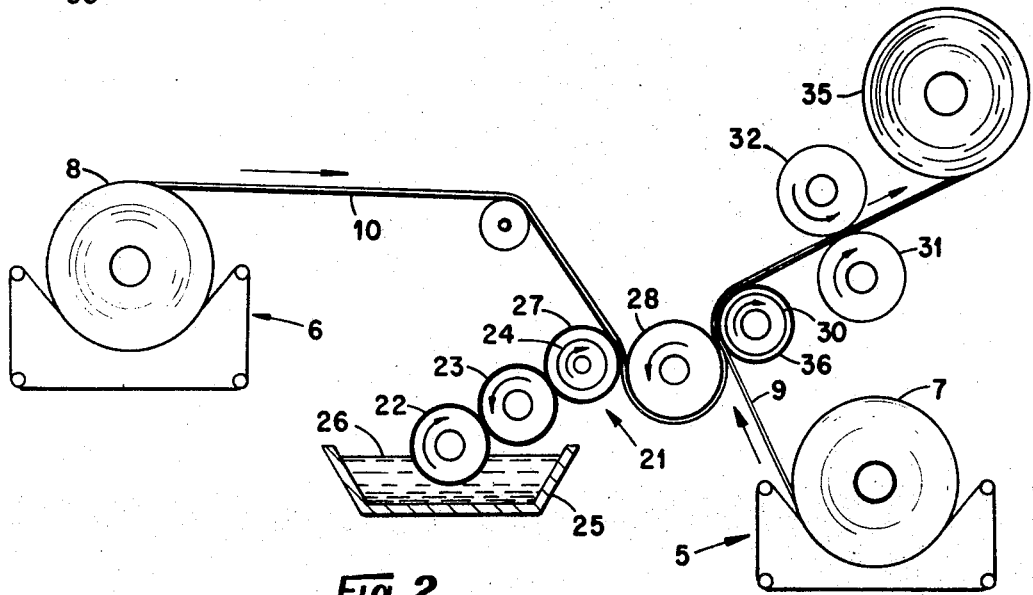

In the drawings:

FIG. 1 is an illustration of a portion of one form of adhesively laminated creped tissue product in accordance with this invention, showing one pattern of embossing and one adhesive pattern such as may be used with the illustrated product to create an aesthetically pleasing dinner napkin; and FIG. 2 is a representation of apparatus for manufacturing the product shown in FIG. 1.

In general the adhesively laminated creped tissue product of the present invention comprises at least two creped tissue webs, bonded together in superposed relation with their lines of creping parallel and with each web in a different condition of stress in the plane of the respective web in the direction normal to the lines of creping. The webs are bonded together by an adhesive disposed in a pattern between the webs. The adhesively joined webs preferably are embossed together about their periphery, leaving the central part of the laminate unembossed or with only minor embossing.

It has been discovered that full realization of the desirable softness of creped tissue, especially in dinner napkins, can be achieved by appropriately adhesively bonding two creped tissue webs in superposed relation. The manner of adhesion is of importance to the invention in that the adhesive is preferably disposed between the webs in a pattern leaving substantial regions unbonded. In a preferred embodiment, the adhesive is disposed in discrete spots evenly distributed over the whole of the laminate, and as so distributed, the adhesive retains the webs in their superposed relation, thereby creating a unitary structure which has been found to exhibit significantly improved strength.

Adhesive inherently stiffens creped tissue and imparts a certain harshness to the tissue. This factor creates a serious limitation on the use of adhesives as practiced in the prior art. However, in the present invention it has been found possible to produce a soft and flexible, yet strong, laminated creped tissue product ( a dinner napkin, for example) by bonding the tissues together with adhesive in an open pattern of discrete spots while maintaining one web under greater tension than the other web until the adhesive has set up, and thereafter relaxing both webs and causing at least that web which was under the lesser tension to buckle slightly. The combination of an open pattern of adhesive and differential tension imparts a cloth-like texture and bulk to the laminate. The adhesive pattern, while not prominent, gives a subtle quilted appearance to the outer surface of the laminate. This appearance is particularly pleasing in those areas of the laminate which are not embossed, as will be discussed hereinafter.

In contrast to the napkins of the prior art, the product of this invention can be effectively embossed with the most exacting of artistic embossing patterns. The pattern detail of the embossing is clearly defined in the present product and, importantly, is retained even in the presence of moisture and under severe conditions of use. Several features of the present invention have been found to contribute to this successful embossing. Specifically, it has been found preferable to emboss the laminate as distinguished from embossing the individual webs before lamination. It is also preferable to utilize a resin of the thermoplastic type as adhesive for bonding the webs together. This adhesive stiffens the laminate at the adhesive spots, holding the embossments firmly. Further, even in the unbonded regions the effect of embossing is improved, for the adhesive effectively locks in fibers adjacent the adhesive spots. At the same time an open pattern of adhesive leaves the laminate as a whole relatively flexible.

The differential tension also contributes to the improved embossing. In those unbonded regions where no adhesive is present, one of the webs is slack. As the web is passed through the nip of embossing rolls the slack web is readily moved deep into the embossing die cavities. Further, substantially more area of the web is present and available for pressing into the cavities. As a result, it has been found possible to produce a pattern of embossing wherein the individual embossments more exactly conform to the individual die cavities and each possesses greater web area, i.e. more body, than heretofore obtainable with creped tissue.

The resultant embossed pattern is aesthetically more pleasing than prior embossing, and it is better retained in the tissue under adverse conditions. For example, tension applied to prior art embossed tissue products in a direction parallel to the plane of the tissue, i.e. pulling opposite ends or sides of the tissue sheet, pulled out or flattened embossments. In the present embossed tissue product, the adhesive resists such stretching and effectively isolates the embossments in unbonded regions against the forces flattening the embossments.

The individual creped webs of the present laminated product preferably comprise creped tissue prepared from sulfite pulp, each web having a basis weight between about 7 and 10 pounds per ream of 2,880 square feet, and a crepe ratio of between about 1.2 and 1.5. Individually, each of the webs may possess a strength-to-rupture (Mullen test) of about 1.31 psi.

As depicted in FIG. 1, the two creped tissue webs are bonded in superposed relation to produce a laminated product 33. Bonding is effected by disposing an adhesive between the webs in accordance with a preselected pattern of application. The adhesive is preferably one of the thermoplastic resins. Polyvinyl alcohol in an aqueous medium has been found particularly desirable because of its fast rate of setting up, its compatibility with the tissue and its inertness in the set up state. A particular adhesive found suitable is 6 percent polyvinyl alcohol as prepared by mixing together 5 parts of polyvinyl alcohol sold under the trademark of COVOL 9870 (distributed commercially by Corn Products Co., New York, New York), with 80 parts of water, 1 part of a wetting agent sold under the trademark of Triton X-100 (distributed commercially by Rohm & Haas Co., Philadelphia, Pa.), and 0.1 part of an antifoaming agent sold under the tradename of Antifoam B (distributed commercially by Rohm & Haas Co.). The wetting agent is optional, but is preferred, in the mixture. It makes the adhesive water-permeable in the final product. The antifoaming agent reduces the foam build-up in the adhesive thereby decreasing the tendency of the adhesive to change in viscosity because of air entrapped in the mixture and avoiding the problem of containment of the foam during the application of the adhesive.

The adhesive is preferably disposed between the webs in accordance with a regular pattern of closely spaced spots 34 as depicted in FIG. 1. The size of the respective unbonded areas between adhesive spots is great enough to permit the hereinbefore described differential stretching of the webs within the unbonded region thereby producing the desired quilted and bulking effects with high flexibility, yet is small enough to hold the embossing in the embossed areas. Unbonded regions encompassing an area on the order of about 0.1 square inch have been found satisfactory and are preferred.

The amount of adhesive applied should be sufficient to produce the desired adhesion of the individual webs without adding substantial stiffness to the resulting product. By concentrating the adhesive described above in spots covering in total between about 4 percent and 8 percent of the total area of the product, the webs are adhered sufficiently that fibers are pulled from the webs before the adhesive bonds break.

In manufacturing dinner napkins, it is preferred that only the border of the napkin be heavily embossed, leaving the central portion unembossed or with only minor embossing. For the most aesthetically pleasing results, the embossing includes intricate design work. This type of embossing is most readily accomplished through the use of small, but closely spaced, embossments whose composite makes up the desired design. Generally, the more marked or definite each individual embossment is made, the more definitive the overall design becomes. As stated hereinbefore, the embossments of the present invention are made more definitive by the increased area of tissue available for pressing into the embossing die cavities and also by the use of the thermoplastic resin. The shape, distribution and orientation of the embossments are dictated principally by the design sought to be imparted to the napkin. One satisfactory embossing pattern is depicted in FIG. 1.

Separation of the plied webs within the unbonded regions is achieved by differentially stretching the two webs elastically prior to bonding them into the laminate, and relaxing the webs after bonding. Control of the tensions in the respective webs as they pass through the manufacturing apparatus provides a stretch in one web greater than that in the other web. While in this state, they are superposed with their lines of creping parallel and with the adhesive disposed between them. After the adhesive has set up, the webs are relaxed from their stretched attitudes. Both webs then contract, with the web which was stretched to the greater extent prior to bonding exhibiting a greater degree of contraction. This differential contraction causes buckling and separation of the webs. The buckling and concomitant separation occur within each unbonded region. Repetition of the effect over the entire laminated product gives the product a very pleasing feel and appearance as well as providing the strength advantage discussed hereinbefore.

The differential stretching of the webs adds bulk to the resulting napkin and also provides a convenient way of controlling bulk. This makes it possible to produce a range of thickness for the laminate from a particular pair of individual webs. In general, it is desirable that the napkins of the present invention have a bulk suggestive of cloth napkins. For such purposes, the laminate preferably will be on the order of about 0.007 inch thick, irrespective of the thickness of the individual webs, which preferably are relatively thin for economy.

Referring now to FIG. 2, apparatus for the manufacture of the present laminated napkin product includes a pair of unwind stands 5 and 6, each designed to dispense continuous webs of creped tissue uniformly from rolls 7 and 8. Preferably, within the unwind stands the rolls of tissue are supported on continuous belts the movements of which turn rolls 7 and 8 at respective uniform speeds, thereby paying out continuous creped tissue webs 9 and 10, respectively, at respective uniform speeds.

The first creped tissue web 10 is dispensed from roll 8 to an adhesive laminating apparatus 21 which includes a fountain roll 22, a transfer roll 23 and a pattern or plate roll 24. The fountain roll 22 is partly immersed in a tank 25 of liquid adhesive 26. It rotates in the adhesive 26 and carries adhesive to the nip between rolls 22 and 23 where the adhesive is transferred in a metered amount to the transfer roll 23. The amount of adhesive transferred to the roll 23 is controlled by the pressure between the rolls 22 and 23. The pattern roll 24 is preferably constructed of steel and has a rubber impression mat 27 provided on its surface. This impression mat 27 has spots raised thereon in accordance with the desired adhesive pattern, as for example, the pattern of spots 34 shown in FIG. 1. As the pattern roll 24 rotates in contact with the transfer roll 23, a controlled quantity of adhesive is transferred to the raised spots at the points of contact. The first web 10 is passed through the nip between the pattern roll 24 and a steel impression roll 28, moving in a direction normal of its lines of creping. As the web 10 passes through the nip, the adhesive is transferred from the patterned spots of the mat 27 to the web 10, thus depositing the adhesive on the web 10 in the same pattern. The second creped tissue web 9 is dispensed from the roll 7 and moved in a direction normal to its lines of creping to overlie the first web 10 with the lines of creping of the second web 9 substantially parallel to the lines of creping of the first web 10. A portion of the adhesive is thereupon transferred to the second web 9. After the adhesive has partially set up, the two webs 9 and 10 with the patterned adhesive therebetween are passed through a nip between the impression roll 28 and a second pattern or plate roll 30 having a surface mat 36 provided with a pattern of raised spots corresponding to the pattern of the pattern roll 24 and driven in registry with the pattern roll 24. In the nip between the impression roll 28 and the second pattern roll 30, pressure is applied substantially only to the adhesive-bearing regions, forcing the partially set up adhesive into bonding relation in the two webs 9 and 10.

In order that the webs of the resulting laminate may be in different conditions of stress, in the course of passing through the laminating apparatus 21, the creped tissue webs 9, 10 are subjected to different respective tensioning forces transverse of the respective lines of creping in the plane of the respective webs. The tension applied to each web during its passage through the apparatus determines the degree to which the web is stretched at the time the webs are bonded. The magnitude of this stretch is established by selective adjustment of the relative speeds of the unwind stands 5,6 and the rolls of the adhesive laminating apparatus 21. By selective adjustment of the hold-back forces of rolls 7, 8, the tension in the second web 9, and hence the stretch in web 9, is made greater than the tension and corresponding stretch in the first web 10 as the two webs are adhesively laminated. Upon relieving the tension in the webs after they leave the nip between rolls 28 and 30, the webs contract to the point where at least web 10 goes slack, and the webs separate in the unbonded regions. This leaves the webs of the laminated product in different conditions of stress, and one web is of greater area than the other.

From the adhesive laminating apparatus 21, the laminate is fed through the nip between a set of embossing rolls comprising a steel embossing roll 32 and steel mating roll 31. Roll 32 has its surface engraved with a pattern of projections and depressions, such as the pattern illustrated in FIG. 1, such depressions constituting die cavities into which the webs are forced during passage through the embossing nip. Mating roll 31 has its surface engraved with a pattern of depressions and projections receiving mating projections and depressions of roll 32 as rolls 31 and 32 are rotated with their engraved surfaces in registry.

The embossed product may be collected as by a wind-up roll 35 or it may be severed into individual napkins and packaged.

EXAMPLE

Following the procedures set forth above, two separate webs of creped tissue paper, each 0.003 inch thick and having a crepe ratio of 1.3 and a dryer basis weight of 9 lbs. (per ream of 2,880 sq. ft.), were fed from rolls 7, 8 at different rates.

One of the webs was directed through the nip between the impression roll 28 and the pattern roll 24 having its surface covered by a rubber impression mat 27 patterned as depicted in FIG. 1. The raised pattern of this mat extended to a height of 0.045 inch from the mat surface. Each spot was 0.0625 inch in diameter and the centers of the spots was 0.25 inch apart. In this example, adhesive was transferred to the first web 10 as it was passed between the impression roll 28 and the pattern roll 24. Polyvinyl alcohol adhesive in the formula described above was used.

Following application of the adhesive to the first web 10, the second web 9 was overlaid on the web 10 with the patterned adhesive between the webs. After the adhesive had partially set up, the webs 9 and 10 with the adhesive therebetween were passed through the nip between a smooth-surfaced impression roll 28 and the matching pattern roll 30 where sufficient pressure was applied to force the partially set up adhesive into bonding relation, hence joining the webs into a two-ply laminate. In this operation, the second web 9 was supplied at a rate about 2 percent slower than the first web 10, thus stretching the former more than the latter. The laminated product was 0.007 inch thick in the unbonded region.

The laminate was embossed with an embossing pattern that repeated itself along the length of the laminate. The laminate was severed between patterns into individual dinner napkins and packaged.

The dinner napkin so produced displayed a faint and somewhat captivatingly elusive, yet definite checkered appearance as a consequence of the patterned adhesive. The embossing pattern was exceptionally definitive with the myriad of embossments standing out individually and contributing to the overall design. In general, the napkin presented the texture and feel of cloth.

Exposure of the napkin product to relative humidities on the order of 90 percent did not cause the embossing to fade materially.

Tension was applied to an embossed napkin made in accordance with the present invention without significant pullout of the embossments or loss of pattern definition. On the other hand, embossments of napkins typical of the prior art pulled out under similar tensions. Similarly, the embossments of the present napkin were not destroyed by twisting, flexing and bending of the napkin in a manner representative of the usual uses of such napkins. Under these conditions of simulated use, as well as under the conditions of testing stated above, no delamination of the webs was observed.

Moreover, the napkin exhibited good drape. It conformed well to the hand when in use and lay neatly in place when draped across the lap.

Various modifications may be made within the scope of the invention. For example, the webs 9 and 10 may be passed through the adhesive laminating apparatus 21 in other paths. The web 10 may be passed through the nip between the transfer roll 23 and the pattern roll 24, and the web 9 may be overlaid at the nip between the pattern roll 24 and the impression roll 28. Other patterns of embossing and adhesive may be used. Various features believed to be novel are included in the following claims.

What is claimed is:

1. An adhesively laminated creped tissue product consisting of at least two creped tissue webs superposed with the lines of creping of each web substantially parallel to the lines of creping of the other, and adhesive disposed between said webs in a pattern of closely spaced discrete spots, leaving substantial areas of said webs unbonded, said webs each being in a different condition of stress in the plane of the respective web in the direction normal of the lines of creping, the laminated webs being embossed as a unit.

2. The product of claim 1 wherein said spots are substantially equally spaced from each other.

3. An adhesively laminated creped tissue napkin consisting of at least two sheets of creped tissue superposed with the lines of creping of each sheet substantially parallel to the lines of creping of the other, and adhesive disposed between said sheets in a pattern of closely spaced spots, leaving substantial areas of said webs unbonded each sheet being in a different condition of stress in the plane of the napkin in the direction normal of the lines of creping, the laminated sheets being embossed as a unit.

4. The napkin of claim 3 embossed about its periphery, leaving its central part unembossed.

5. An adhesively laminated creped tissue napkin consisting of at least two sheets of creped tissue each having a basis weight of about 5 to 16 pounds per 2,880 square feet and creped with a crepe ratio of about 1.2 to 1.5 with parallel lines of creping, said sheets being superposed with the lines of creping of each sheet substantially parallel to the lines of creping of the other, and adhesive disposed between said sheets in a pattern of closely spaced spots, leaving substantial areas of said webs unbonded each sheet being in a different condition of stress in the plane of the napkin in the direction normal of the lines of creping, the laminated sheets being embossed together and the thickness of the unembossed laminate being about 0.005 to 0.009 inch.

* * * * *